US006421171B1

(12) United States Patent
Bayart et al.

(10) Patent No.: US 6,421,171 B1
(45) Date of Patent: Jul. 16, 2002

(54) L-BAND OPTICAL FIBER AMPLIFIER

(75) Inventors: Dominique Bayart, Clamart; José Chesnoy, Paris, both of (FR)

(73) Assignee: Alcatel, Paris (FR)

( * ) Notice: Subject to any disclaimer, the term of this patent is extended or adjusted under 35 U.S.C. 154(b) by 57 days.

(21) Appl. No.: 09/660,418

(22) Filed: Sep. 12, 2000

(30) Foreign Application Priority Data

Sep. 23, 1999 (FR) ............................................. 99 11872

(51) Int. Cl.$^7$ ................................................. H01S 3/00
(52) U.S. Cl. .................................................. 359/341.1
(58) Field of Search ........................ 359/337.1, 337.4, 359/337, 341.1, 341.3

(56) References Cited

U.S. PATENT DOCUMENTS 6,288,834 B1 * 9/2001 Sugaya et al. ............ 359/341.1
6,307,669 B1 * 10/2001 Flood et al. .............. 359/341.3

FOREIGN PATENT DOCUMENTS

JP          10 093 174 A     4/1998  ............. H01S/3/10

OTHER PUBLICATIONS

Ishikawa et al., "High Gain per Unit Length Silica–Based Erbium Doped Fiber for 1580nm Band Amplification", OSA Tops vol. 25, Optical Amplifiers and Their Applications, pp. 64–67. 1998.*

Desurvire, Emmanuel. Erbium–Doped Fiber Amplifiers Principles and Applications. John Wiley & Sons, Inc. 1994. pp. 270–271 and 396–397.*

Hatton et al., "Accurately Predicting the Cutoff Wavelength of Cabled Single–Mode Fiber", Journal of Lightwave Technology, Vo 8, No. 10, Oct. 1990.*

Rottwitt et al., "Fundamental Design of Distributed Erbium–Doped Fiber Amplifier for Long–Distance Transmission", Journal of Lightwave Technology, vol. 10, No. 11, Nov. 1992.*

Hansen et al., "L–Band Erbium Doped Fiber Amplifiers–Theory and Design", Jan. 31, 2000.*

Massicott, J. F. et al. :"High gain, broadband, 1.6 mu m Er/sup 3+/ doped silica fibre amplifier" Electronics Letters, Sep. 27, 1990, UKL, vol. 26, No. 20, pp. 1645–1646, XP000109503, ISSN: 0013–5194.

Massicott, J. F. et al.: "Low noise operation of Er/sup 3+ doped silica fibre amplifier around 1.6 mu m" Electronics Letters, Sep. 24, 1992, UK, vol. 28, No. 20, pp. 1924–1925, XP000315929.

Juhan Lee et al.: "Enhancement of power conversion efficiency for an L–band EDFA with a secondary pumping effect in the umpumped EDF seciton" IEEE Photonics Technology Letters, Jan. 1999, IEEE, USA, vol. 11, No. 1, pp. 42–44, XP000801384 ISSN: 1041–1135.

Karasek, M.: "Gain enhancement in gain–shifted erbium–doped fiber amplifiers for WDM applications" IEEE Photonics Technology Letters, Sep. 1999, IEEE, USA, vol. 11, No. 9, pp. 1111–1113, XP000882915, ISSN: 1041–1135.

* cited by examiner

Primary Examiner—Thomas H. Tarcza
Assistant Examiner—Deandra M. Hughes
(74) Attorney, Agent, or Firm—Sughrue Mion, PLLC

(57) ABSTRACT

To optimize the efficiency of optical amplifiers operating in the L-band, an L-band optical amplifier includes a doped fiber having a cut-off wavelength greater than 1 535 nm and a coupler for coupling into the fiber a pump supplying light in the C-band. The C-band pump is a high-power pump, with a power rating of at least 10 mW, which supplies at least 10% of the pumping energy. A pump operating at a wavelength below the C-band can also be coupled into the fiber, for example a 980 nm or 1 480 nm pump.

19 Claims, 1 Drawing Sheet

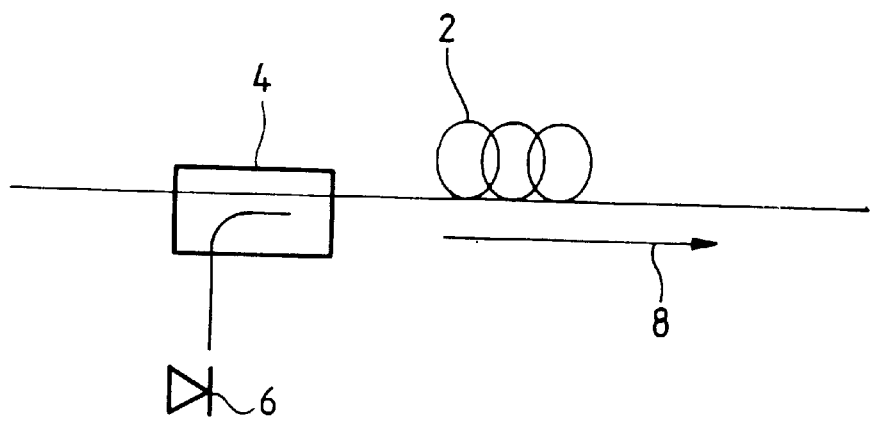
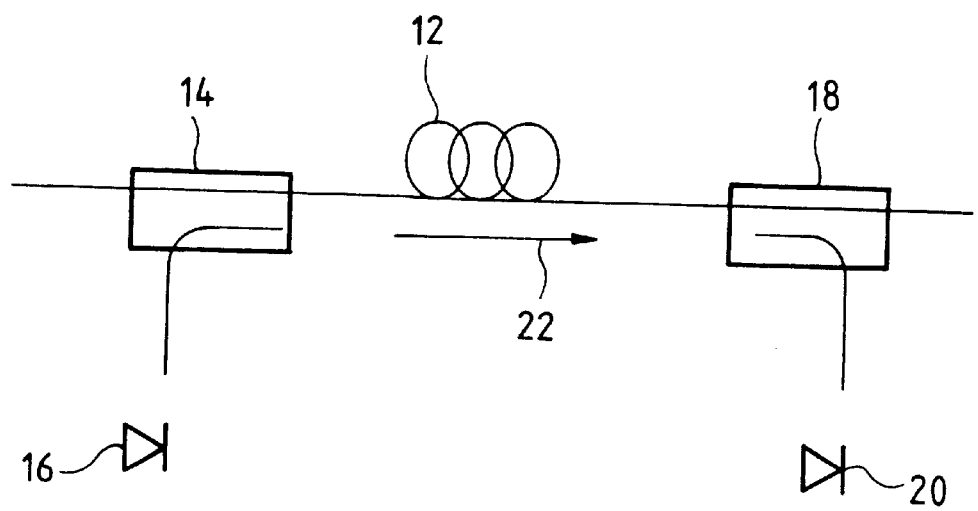

L-BAND OPTICAL FIBER AMPLIFIER

BACKGROUND OF THE INVENTION

1. Field of the Invention

The present invention relates to optical fiber amplifiers.

2. Description of the Prior Art

Optical fiber amplifiers are used at regular intervals in optical fiber transmission systems to compensate line losses. An optical fiber amplifier comprises a fiber doped with erbium, for example, and pumping means. The population inversion achieved by pumping amplifies the signal.

Various bands are used by optical fiber transmission systems, particularly in terrestrial transmission systems. The expression "C-band" refers to the range of wavelengths from 1 529 nm to 1 565 nm and the expression "L-band" refers to the range of wavelengths from 1 569 nm to 1 603 nm.

A problem associated with this type of optical fiber amplifier is that of noise. Power is lost because of amplified spontaneous emission (ASE). This noise propagates in the fiber in both directions. Amplified spontaneous emission noise occurs in particular at wavelengths at which the emission effective cross section is maximum (for example in the 1.5 µm window in the case of an erbium-doped fiber). Also, the higher the population inversion, the higher the noise level. This is the case in particular at the end of the doped fiber adjacent the pumping means, where the pumping ratio is highest.

J. Massicott et al., "Low noise operation of $Er^{3+}$ doped silica fibre amplifier around 1.6 µm", Electron. Lett., 1992, 20, p. 1924–1925 proposes the use of an erbium-doped fiber amplifier for signals in a band from 1 570 nm to 1 605 nm. The article explains that a population inversion of the order of 60% is suitable for using erbium-doped fiber as an amplifier in the band centered on 1 550 nm. On the other hand, a population inversion of around 35% enables use of the fiber as an amplifier in the band from 1 570 nm to 1 605 nm. The article proposes the use of two pumps at two different wavelengths to obtain the population inversion. The 1.48 µm main pump has a power rating of 82 mW and is used to obtain a high population inversion. The 1.555 µm auxiliary pump has a power rating of 1 mW and is used to saturate the amplifier and to reduce the population inversion to 35%.

Y. Sun et al., "80 nm ultrawideband erbium-doped silica fibre amplifier", Electron. Lett., 1997, 23, p. 1965–1967 proposes an erbium-doped fiber amplifier which amplifies signals in the C-band and in the L-band. The amplifier has a first section which is common to both bands and a second section in which the signals in the two bands are amplified separately in two separate branches. Wideband Bragg gratings and circulators integrated into the fiber and reflecting the C-band are respectively used to multiplex and demultiplex the two bands before and after the second section. The use of two amplification stages in the amplification branch for the L-band is proposed; the first stage uses a 980 nm pump with a power rating of 20 dBm and the second stage uses a 980 nm pump with a power rating of 25 dBm and a saturation signal at 1 592 nm, with a saturation signal input power of the order of −4 dBm.

J. Massicott et al., "High gain, broadband 1.6 µm $Er^{3+}$ doped silica fibre amplifier", Electron. Lett., 1990, 20, p. 1645–1646 proposes amplifying signals at around 1 600 nm in a doped fiber pumped at 1 555 nm. The fiber proposed is a $SiO_2$—$Al_2O_3$—$GeO_2$ core fiber with a core diameter of 5.5 µm and a Δn of 0.015. A fiber of this kind has a cut-off wavelength of the order of 1 200 nm.

The problem of optimizing the gain arises in prior art L-band amplifiers. In particular, using 1 480 nm or 980 nm pumps causes a high population inversion in the doped fiber in the vicinity of the pump injection coupler; there is then a high gain in this part; the amplified spontaneous emission noise is therefore also high. This causes energy losses. The length of the doped fiber can be varied to reduce the average population inversion for use in the L-band but cannot improve the efficiency of the amplifier.

The use of a 1 550 nm pump in the configuration proposed in the 1990 article by J. Massicott et al. also gives rise to the problem of managing noise and confining the signal and the pump within the core of the fiber.

The invention proposes a solution to the above new problems. It proposes an L-band amplifier which limits the effect of amplified spontaneous emission noise. It also proposes a transmission system using that amplifier.

SUMMARY OF THE INVENTION

To be more precise, the invention proposes an L-band optical amplifier including a doped optical fiber which has a cut-off wavelength not less than 1 535 nm and means for coupling a pump into the fiber. In one embodiment the pump supplies light in the C-band at a wavelength greater than the cut-off wavelength of the fiber.

The cut-off wavelength of the fiber is advantageously greater than 1 540 nm and the pump can provide at least 10% of the pumping energy and preferably at least 40% of the pumping energy.

In another embodiment the pump has a power rating of at least 10 mW.

The pump can be a co-directional pump or a contra-directional pump.

In another embodiment the amplifier includes means for coupling into the fiber a second pump supplying light at a wavelength less than the wavelengths of the C-band. For example, the second pump can have a wavelength of 980 nm or 1 480 nm.

The invention also proposes an optical fiber transmission system including an amplifier of the above kind and a source of L-band signals.

The invention also proposes an optical amplification method for an L-band signal, including injecting the L-band signal into a doped optical fiber having a cut-off wavelength not less than 1 535 nm and pumping the signal.

The signal is preferably pumped with light in the C-band at a wavelength greater than the cut-off wavelength of the fiber.

The cut-off wavelength of the fiber is advantageously greater than 1 540 nm and the light in the C-band can supply at least 10% of the pumping energy and preferably at least 40% of the pumping energy.

The pumping can be co-directional pumping or contra-directional pumping.

Another embodiment of the invention proposes pumping with light at a wavelength less than the wavelengths of the C-band, for example at a wavelength of 980 nm or 1 480 nm.

Other features and advantages of the invention will become apparent on reading the following description of embodiments of the invention, which description is given by way of example and with reference to the accompanying diagrammatic drawing.

BRIEF DESCRIPTION OF THE DRAWING

FIG. 1 shows a single-pump amplifier according to the invention.

FIG. 2 shows a double-pump amplifier according to the invention.

DETAILED DESCRIPTION OF THE PREFERRED EMBODIMENTS

The invention proposes the use of a fiber whose cut-off wavelength is greater than 1 535 nm. It also proposes the use of a C-band pump for pumping a doped optical fiber to amplify L-band signals.

The use of a C-band pump produces the population inversions necessary for amplification in the L-band, but with a lower gain in the L-band, and therefore a greater amplifier efficiency. The cut-off wavelength of the fiber confines the pump and the signals in the core of the fiber and prevents the fiber guiding the amplified spontaneous emission noise. The invention limits cumulative amplified spontaneous emission noise in the C-band, improves the noise factor of the amplifier and simplifies noise suppression.

FIG. 1 is a diagrammatic representation of a single-pump amplifier according to the invention; the amplifier includes a section 2 of doped optical fiber, for example of optical fiber doped with erbium. The fiber can be a single-core fiber or a double-core fiber, for example, with an index variation from $5 \times 10^{-3}$ to $30 \times 10^{-3}$. Doping the core of a silica fiber at the rate of approximately 500 ppm by weight can achieve such characteristics. The length of the fiber is typically from 10 m to 100 m and preferably from 20 m to 60 m. The length of the fiber is adapted to suit the required gain, by a method which parallels that used to adapt the length of the fibers of prior art C-band optical amplifiers. The cut-off wavelength of the fiber is not less than 1 535 nm and preferably greater than 1 540 nm. The cut-off wavelength is determined by measuring the attenuation difference of a white source injected into the fiber between a 60 mm diameter loop and a 280 mm diameter loop. This is known in the art.

The cut-off wavelength is higher than the wavelength of the fluorescence peak of the fiber (approximately 1 530 nm), in the vicinity of which the amplified spontaneous emission noise has a maximum amplitude. The invention therefore limits propagation and amplification of amplified spontaneous emission noise. What is more, this cut-off wavelength, which is high in comparison to the prior art solutions in prior art C-band amplifiers, confines the pump light and the signal to be amplified within the core of the fiber. This improves the efficiency of the amplifier because the ions which dope the fiber are in the fiber core.

The amplifier includes a light injection coupler 4 provided by a pump 6. The coupler can be of a type known in the art and widely used in prior art amplifiers, and there is therefore no need to describe it in detail.

In accordance with the invention, the pump supplies light in the C-band. Light at a wavelength of approximately 1 550 nm can be used, for example, supplied by a light source of a type which is also known in the art. A pump operating at a shorter wavelength could also be used, for example a wavelength around 1 545 nm; it is clear that the pump wavelength is preferably greater than the cut-off wavelength of the fiber.

The arrow 8 in FIG. 1 shows the direction of propagation of the signals to be amplified; as indicated above, those signals are L-band signals having a wavelength from 1 569 nm to 1 603 nm. In the example shown in the figure, the pump is a co-directional or co-propagative pump, which is injected into the doped fiber so that its light propagates in the same direction as the signals to be amplified.

The pump could also be a contra-directional pump, without this changing how the amplifier according to the invention works. The pump power is preferably not less than 10 mW; it pumps L-band signals which are injected into the amplifier via the end of the doped fiber near the coupler.

FIG. 2 is a diagrammatic representation of an amplifier according to the invention which includes two pumps. Like the amplifier shown in FIG. 1, this amplifier includes a section of erbium-doped optical fiber 12. The amplifier has at one end of the optical fiber section a first coupler 14 for coupling light from a first pump 16 into the doped fiber; at the other end of the optical fiber section it has a second coupler 18 for coupling light from a second pump 20 into the doped fiber. As in the FIG. 1 embodiment, the couplers are based on devices known in the art.

The arrow 22 indicates the direction of propagation through the amplifier of L-band signals injected into the fiber. The figure shows that the light injected from the first source is co-directional and that the light injected from the second source is contra-directional.

According to the invention, one of the two sources supplies light in the C-band, for example, as in the case of FIG. 1, light at 1 550 nm; in the FIG. 2 example this can be the contra-directional source 20. The other source supplies light which can be pumping light at 980 nm or 1 480 nm, for example. Other pumping values at wavelengths below the C-band can be used. Although the pump has a wavelength below the cut-off wavelength, it retains its transverse monomode character in the amplification fiber, because of its absorption by the fiber and the short lengths of fiber used in the optical amplifier.

The C-band pump not only saturates the amplifier but also contributes some of the pumping energy; it supplies at least 10%, and preferably more than 40%, of the pumping energy. In energy terms, the C-band pump advantageously has a power rating of at least 10 mW, i.e. 10 dBm.

The FIG. 2 amplifier can also be modified so that both pumps used propagate in the same direction; to this end, a double coupler could be used to inject the two pumps, or two couplers offset along the fiber. The propagation directions of the 980 nm and 1 550 nm pumps could also be interchanged.

In FIGS. 1 and 2 the C-band pump provides the required population inversion in the L-band to achieve amplification, but requires a lower pumping power than prior art amplifiers. Consequently, cumulative amplified spontaneous emission noise in the C-band is lower than in prior art amplifiers, because the net gain is naturally maintained by the saturation of pumping below the absorption losses. Pumping is more homogeneous in the L-band, which improves the noise factor and the efficiency.

Accordingly, the efficiency of an amplifier in accordance with the invention is of the order of 50%, which should be compared with the 40% efficiency of prior art amplifiers. It is difficult to reduce the noise factor below 4 dB in prior art amplifiers; the invention reduces it to 3 dB in the embodiment using a 980 nm pump.

The invention therefore proposes an L-band amplifier which is in fact a single-band amplifier: it is not intended to be used to amplify signals in other bands conjointly with L-band signals.

Of course, the present invention is not limited to the examples and embodiments described and shown, but is open to many variants that will suggest themselves to the skilled person. Two separate sections of optical fiber could be used in the FIG. 2 embodiment, pumped separately by the two pumps. Fiber doped with other rare earths could be substituted for the erbium-doped fiber.

The embodiments described use a C-band pump, and where necessary a pump at a lower wavelength. The invention can also be implemented merely using a pump at a wavelength less than the cut-off wavelength of the amplifier fiber, for example a 980 nm or 1 480 nm pump.

There is claimed:

1. An L-band optical amplifier including a doped optical fiber which has a cut-off wavelength not less than 1 535 nm and means for coupling a pump into said fiber.

2. The amplifier claimed in claim 1 wherein said pump supplies light in the C-band at a wavelength greater than the cut-off wavelength of said fiber.

3. The amplifier claimed in claim 1 wherein the cut-off wavelength of said fiber is greater than 1 540 nm.

4. The amplifier claimed in claim 1 wherein said pump provides at least 10% of the pumping energy and preferably at least 40% of the pumping energy.

5. The amplifier claimed in claim 1 wherein said pump has a power rating of at least 10 mW.

6. The amplifier claimed in claim 1 wherein said pump is a co-directional pump.

7. The amplifier claimed in claim 1 wherein said pump is a contra-directional pump.

8. The amplifier claimed in claim 2 further including means for coupling into said fiber a second pump supplying light at a wavelength less than the wavelengths of the C-band.

9. The amplifier claimed in claim 8 wherein said second pump has a wavelength of 980 nm or 1 480 nm.

10. An optical method of amplifying an L-band signal, including injecting said L-band signal into a doped optical fiber having a cut-off wavelength not less than 1 535 nm and pumping said signal.

11. The method claimed in claim 10 wherein said signal is pumped with light in the C-band at a wavelength greater than the cut-off wavelength of said fiber.

12. The method claimed in claim 10 wherein the cut-off wavelength of said fiber is greater than 1 540 nm.

13. The method claimed in claim 10 wherein light in the C-band supplies at least 10% of the pumping energy and preferably at least 40% of the pumping energy.

14. The method claimed in claim 10 wherein said pumping is co-directional pumping.

15. The method claimed in claim 10 wherein said pumping is contra-directional pumping.

16. The method claimed in claim 11 including pumping with light at a wavelength less than the wavelengths of the C-band.

17. The method claimed in claim 16 wherein said light has a wavelength of 980 nm or 1 480 nm.

18. An optical fiber transmission system including:

an L-band optical amplifier, said L-band optical amplifier including a doped optical fiber which has a cut-off wavelength not less than 1 535 nm and a coupler which couples a pump into said fiber; and a source of L-band signals.

19. An L-band optical amplifier including a doped optical fiber which has a cut-off wavelength not less than 1 535 nm and a coupler which couples a pump into said fiber.

* * * * *